(12) United States Patent
Hratko et al.

(10) Patent No.: US 8,965,380 B2
(45) Date of Patent: Feb. 24, 2015

(54) SYSTEM AND METHOD FOR PROVIDING ACCESS IN A NETWORK ENVIRONMENT

(75) Inventors: Steve Hratko, Belmont, CA (US); Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 12/539,446

(22) Filed: Aug. 11, 2009

(65) Prior Publication Data
US 2011/0039560 A1 Feb. 17, 2011

(51) Int. Cl.
| | |
|---|---|
| H04W 36/00 | (2009.01) |
| H04W 36/08 | (2009.01) |
| H04W 36/32 | (2009.01) |
| H04W 36/04 | (2009.01) |
| H04W 84/04 | (2009.01) |

(52) U.S. Cl.
CPC .............. *H04W 36/04* (2013.01); *H04W 36/32* (2013.01); *H04W 84/045* (2013.01)
USPC ........... 455/444; 455/436; 455/440; 455/441; 455/439

(58) Field of Classification Search
CPC ............ H04W 24/02; H04W 36/0083; H04W 72/0466; H04W 84/045; H04W 36/0022; H04W 36/0061; H04W 36/04; H04W 48/02; H04W 60/04; H04W 84/105
USPC ................................................. 455/436–444
See application file for complete search history.

(56) References Cited

U.S. PATENT DOCUMENTS

| | | | |
|---|---|---|---|
| 5,432,907 A | 7/1995 | Picazo et al. | |
| 6,094,578 A | 7/2000 | Purcell et al. | |
| 6,108,789 A | 8/2000 | Danes et al. | |
| 6,185,205 B1 | 2/2001 | Sharrit et al. | |
| 6,233,315 B1 | 5/2001 | Reformato et al. | |
| 6,385,651 B2 | 5/2002 | Danes et al. | |

(Continued)

FOREIGN PATENT DOCUMENTS

| | | |
|---|---|---|
| CN | 102158896 | 8/2011 |
| WO | WO2012/038911 | 3/2012 |
| WO | WO2013/167190 | 11/2013 |

OTHER PUBLICATIONS

U.S. Appl. No. 12/619,273, filed Nov. 16, 2009, entitled "System and Method for Providing Enterprise Integration in a Network Environment," Inventor(s): Mark Grayson et al.
U.S. Appl. No. 12/726,224, filed Mar. 17, 2010, entitled "System and Method for Providing Rate Control in a Network Environment," Inventor(s): Mark Grayson et al.

(Continued)

*Primary Examiner* — Matthew Sams
(74) *Attorney, Agent, or Firm* — Patent Capital Group

(57) ABSTRACT

A method is provided in one example embodiment and includes evaluating geolocation information associated with a mobile node and using the geolocation information to identify a femtocell capable of providing network access to the mobile node. A primary scrambling code is provided to the mobile node for operation in an idle mode. The method also includes communicating a secondary scrambling code to initiate access to the femtocell by the mobile node when operating in an active mode. In more particular embodiments, the secondary scrambling code is included in a broadcast message that includes a femtocell identifier associated with the femtocell. The femtocell is identified from a plurality of femtocells based on geolocation information associated with the femtocell. The primary scrambling code is part of a range of primary scrambling codes allocated to a plurality of femtocells within a macro network coverage area.

14 Claims, 4 Drawing Sheets

(56) References Cited

U.S. PATENT DOCUMENTS

| | | | |
|---|---|---|---|
| 6,745,246 B1 | 6/2004 | Erimli et al. | |
| 6,813,250 B1 | 11/2004 | Fine et al. | |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,345,991 B1 | 3/2008 | Shabtay et al. | |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,463,597 B1 | 12/2008 | Kompella | |
| 7,555,546 B1 | 6/2009 | Anumala | |
| 7,574,202 B1 | 8/2009 | Tsao et al. | |
| 7,685,295 B2 | 3/2010 | Myers et al. | |
| 7,724,656 B2 | 5/2010 | Sagfors | |
| 8,064,480 B2 | 11/2011 | Bitter et al. | |
| 8,089,963 B2 | 1/2012 | Melman et al. | |
| 8,112,330 B1 | 2/2012 | Grandcolas et al. | |
| 8,121,598 B2* | 2/2012 | Hamel et al. | 455/435.1 |
| 8,130,655 B2 | 3/2012 | Foottit | |
| 8,140,081 B2* | 3/2012 | Barrett et al. | 455/444 |
| 8,194,556 B2 | 6/2012 | Tacconi et al. | |
| 8,208,933 B1* | 6/2012 | Talley et al. | 455/446 |
| 8,335,161 B2 | 12/2012 | Foottit | |
| 2002/0191572 A1 | 12/2002 | Weinstein et al. | |
| 2005/0118946 A1 | 6/2005 | Colban et al. | |
| 2005/0201406 A1 | 9/2005 | Sekine et al. | |
| 2005/0223111 A1 | 10/2005 | Bhandaru et al. | |
| 2005/0256969 A1 | 11/2005 | Yancey et al. | |
| 2006/0050667 A1 | 3/2006 | Verma et al. | |
| 2006/0199591 A1* | 9/2006 | Klatt | 455/450 |
| 2006/0281471 A1 | 12/2006 | Shaffer et al. | |
| 2007/0183404 A1 | 8/2007 | Hofer | |
| 2008/0084822 A1 | 4/2008 | Sagfors | |
| 2008/0095086 A1 | 4/2008 | Linkola et al. | |
| 2008/0101301 A1* | 5/2008 | Thomas et al. | 370/335 |
| 2008/0155094 A1 | 6/2008 | Roese et al. | |
| 2008/0170548 A1* | 7/2008 | Suh et al. | 370/331 |
| 2008/0253342 A1 | 10/2008 | So et al. | |
| 2009/0005053 A1 | 1/2009 | Agin | |
| 2009/0059795 A1 | 3/2009 | Fonseca et al. | |
| 2009/0163216 A1* | 6/2009 | Hoang et al. | 455/450 |
| 2009/0219888 A1* | 9/2009 | Chen et al. | 370/331 |
| 2010/0075658 A1* | 3/2010 | Hou et al. | 455/422.1 |
| 2010/0093351 A1* | 4/2010 | Barrett et al. | 455/436 |
| 2010/0113032 A1* | 5/2010 | Lee et al. | 455/437 |
| 2010/0113035 A1* | 5/2010 | Eskicioglu et al. | 455/444 |
| 2010/0165960 A1* | 7/2010 | Richardson | 370/338 |
| 2010/0232293 A1 | 9/2010 | Sagfors | |
| 2010/0267386 A1* | 10/2010 | Lim et al. | 455/436 |
| 2010/0290398 A1 | 11/2010 | Chaudhary et al. | |
| 2011/0021196 A1 | 1/2011 | Grayson et al. | |
| 2011/0082924 A1 | 4/2011 | Gopalakrishnan | |
| 2011/0105129 A1* | 5/2011 | Kim et al. | 455/443 |
| 2011/0170408 A1 | 7/2011 | Furbeck et al. | |
| 2011/0194534 A1* | 8/2011 | Carmon et al. | 370/331 |
| 2011/0299395 A1 | 12/2011 | Mariblanca | |
| 2012/0051216 A1 | 3/2012 | Zhang et al. | |
| 2012/0096159 A1 | 4/2012 | Short et al. | |

OTHER PUBLICATIONS

F. Adrangi et al., Identity Selection Hints for the Extensible Authentication Protocol (EAP); RFC 4284; Jan. 2006; http://ietfreport.isoc.org/rfc/PDF/rfc4284.pdf; 14 pages.

B. Berry et al., PPP Over Ethernet (PPoE) Extensions for Credit Flow and Link Metrics; RFC 4938; Jun. 2007; http://www.ietf.org/rfc/rfc4938.txt.pdf; 17 pages.

Wikipedia, "Plectron," http://en.wikipedia.org/wiki/Plectron, Dec. 18, 2008, 2 pages.

Thunder Eagle, Inc.—Radio Wireless Alerting Systems, "MRI-100™: Multi Radio Interface," http://www.thuneagle.com/mri100.htm, Dec. 18, 2008, 2 pages.

Positron Public Safety Systems, "Product Specifications: Power RADIO," http://www.positron911.com/products/powerRADIO/powerRADIO_specs.asp, Dec. 18, 2008, 2 pages.

Wikipedia, "Minimum spanning tree," http://en.wikipedia.org/wiki/Minimum_spanning_tree, Dec. 18, 2008, 5 pages.

Wikipedia, "Distributed minimum spanning tree," http://en.wikipedia.org/wiki/Distributed_minimum_spanning_tree, Dec. 18, 2008, 2 pages.

Broadband Forum, "TR-196 Femto Access Point Service Data Model," Issue 1; Issue Date: Apr. 2009; 131 pages.

V. Chandrasekhar and J.G.Andrews, "Femtocell Networks: A Survey," The University of Texas at Austin; A. Gatherer, Texas Instruments; Jun. 28, 2008; 23 pages.

Kineto Wireless, Inc., "UMA: The 3GPP Standard for Femtocell-to-Core Network Connectivity," Aug. 2007; 9 pages.

USPTO Sep. 28, 2012 Non-Final Office Action from U.S. Appl. No. 12/726,224.

USPTO Oct. 15, 2012 Response to Jul. 16, 2012 Non-Final Office Action from U.S. Appl. No. 12/619,273.

U.S. Appl. No. 13/551,374, filed Jul. 17, 2012, entitled "System and Method for Indicating a Level of RAN Congestion for User Plane Traffic in a Network Environment," Inventor(s): Nirav Salot et al.

USPTO Jul. 16, 2012 Non-Final Office Action from U.S. Appl. No. 12/619,273.

USPTO Nov. 28, 2012 Final Office Action from U.S. Appl. No. 12/619,273.

USPTO Dec. 26, 2012 Response to Sep. 28, 2012 Non-Final Office Action from U.S. Appl. No. 12/726,224.

USPTO Jan. 23, 2013 Notice of Allowance from U.S. Appl. No. 12/726,224.

U.S. Appl. No. 14/044,734, filed Oct. 2, 2013, entitled "Reporting Radio Access Network Congestion Information in a Network Sharing Environment," Inventor(s): Maulik Vijay Vaidya, et al.

USPTO Apr. 10, 2014 Non-Final Office Action from U.S. Appl. No. 12/619,273.

USPTO Dec. 20, 2013 Non-Final Office Action from U.S. Appl. No. 13/551,374.

USPTO Feb. 26, 2013 RCE Response to Nov. 28, 2012 Final Office Action from U.S. Appl. No. 12/619,273.

USPTO Jun. 4, 2014 Final Office Action from U.S. Appl. No. 13/551,374.

USPTO Aug. 29, 2014 Notice of Allowance from U.S. Appl. No. 12/619,273.

\* cited by examiner

CONNECTED MODE

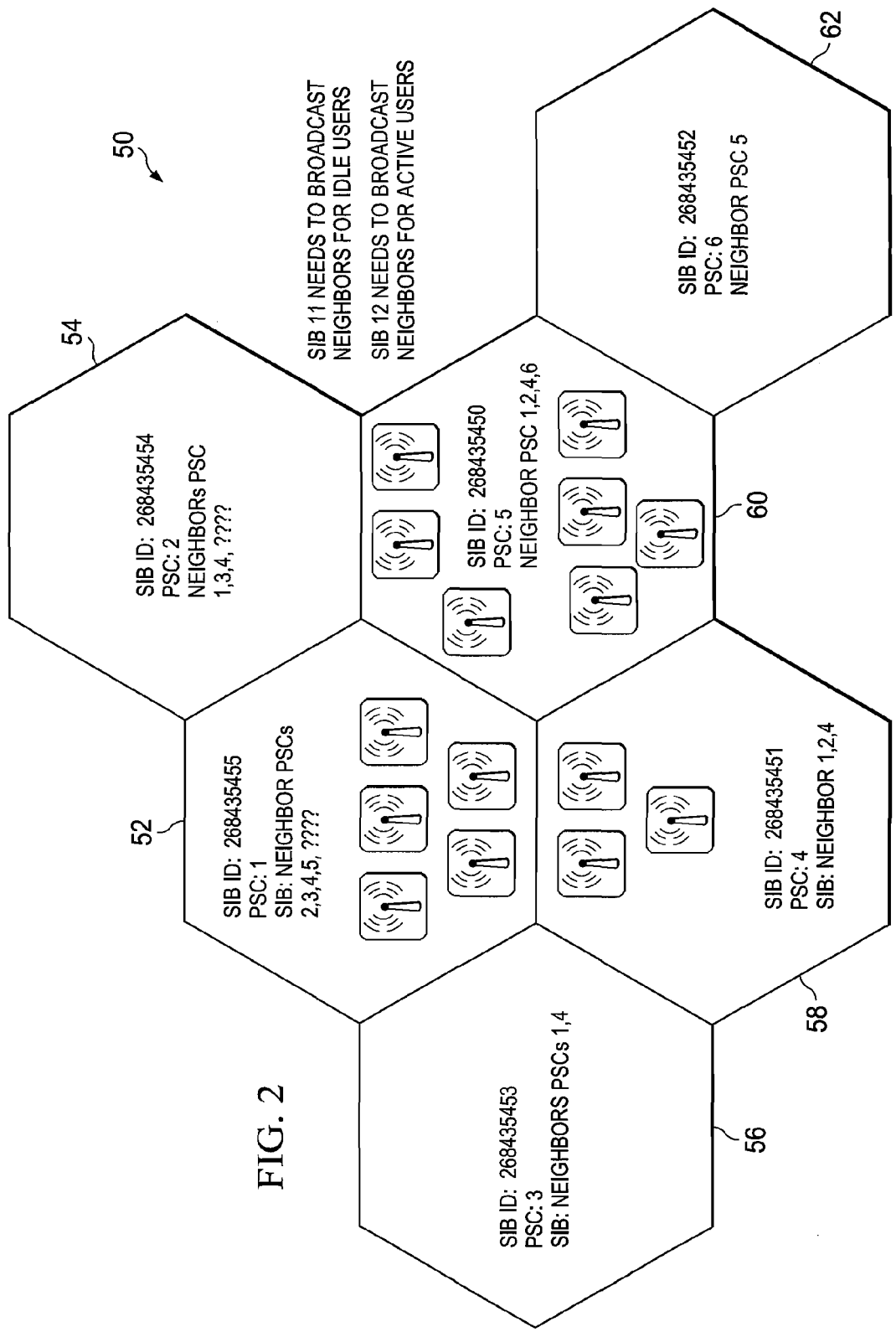

SYSTEM AND METHOD FOR PROVIDING ACCESS IN A NETWORK ENVIRONMENT

TECHNICAL FIELD

This disclosure relates in general to the field of communications and, more particularly, to providing access in a network environment.

BACKGROUND

Networking architectures have grown increasingly complex in communication environments. Femtocells have gained recent notoriety due to their capabilities. In general terms, femtocells represent wireless access points that operate in licensed spectrum to connect mobile devices to a mobile operator's network (e.g., using broadband connections). For a mobile operator, the femtocells offer improvements to both coverage and capacity: particularly indoors. There may also be opportunities for new services, while reducing the overall cost of providing network access. Femtocells are also an alternative way to deliver the benefits of fixed-mobile convergence. For many femto scenarios, connectivity and/or access protocols can pose a number of problems for end users.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 is a simplified block diagram of a femtocell system for providing access in a network environment in accordance with an embodiment of the present disclosure.

DETAILED DESCRIPTION OF EXAMPLE EMBODIMENTS

Overview

A method is provided in one example embodiment and includes evaluating geolocation information associated with a mobile node and using the geolocation information to identify a femtocell capable of providing network access to the mobile node. A primary scrambling code is provided to the mobile node for operation in an idle mode. The method also includes communicating a secondary scrambling code to initiate access to the femtocell by the mobile node when operating in an active mode. In more particular embodiments, the secondary scrambling code is included in a broadcast message that includes a femtocell identifier associated with the femtocell. The femtocell is identified from a plurality of femtocells based on geolocation information associated with the femtocell. The primary scrambling code is part of a range of primary scrambling codes allocated to a plurality of femtocells within a macro network coverage area.

Example Embodiments

Figure 1A:
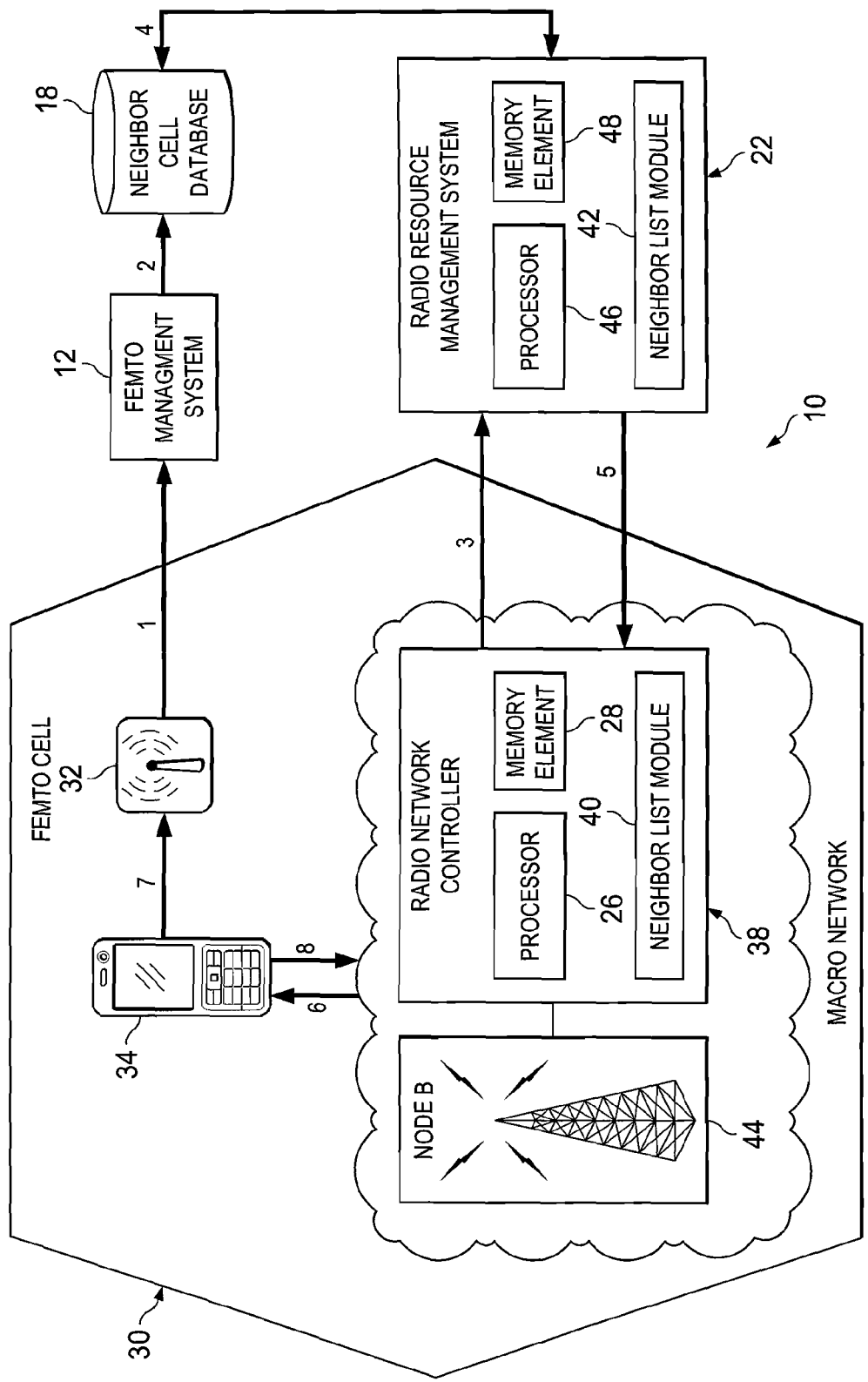
FIG. 1A is a simplified block diagram of a communication system for providing access in a network environment in accordance with one embodiment of the present disclosure.

Turning to FIG. 1A, FIG. 1A is a simplified block diagram of a communication system 10 for providing access in a network environment. FIG. 1A (in this particular example) can be indicative of a connected mode scenario involving a given end user. FIG. 1A includes a femto management system 12, a neighbor cell database 18, a radio resource management system 22, a macro network 30, a femtocell 32, a mobile node 34, and a radio network controller (RNC) 38, which is configured to interface with a Node B 44. RNC 38 may include a processor 26, a memory element 28, and a neighbor list module 40. In a similar configuration, radio resource management system 22 may include a processor 46, a memory element 48, and a neighbor list module 42. FIG. 1A could represent a traditional wideband code division multiple access (WCDMA) deployment. A protocol could exist within the architecture such that broadcasting occurs between various elements within the system. For example, a system information block (SIB) protocol could be used to broadcast scrambling codes within the system, as detailed further below.

Note that the scale of the mobile Internet model requires smaller femtocells to be fully integrated into the network architecture. Initial attempts to integrate femtocells have focused on a closed model, which only supports hand-out between femtocell 32 and macro network 30. Typically, in limited hand-in solutions, the neighbor cell list is populated with a pool of scrambling codes allocated to the femtocell population. Hand-in can then be supported if, for example, in a closed femto environment, a user is authorized to access a specific (single) femtocell. A femto controller, on receiving the hand-in request, can perform a look up to see which femtocell the user is authorized to access and, subsequently, forward the hand-in request only to the specific femtocell. In this case, the neighbor cell is populated with the pool of 6 or 8 scrambling codes allocated to the femtocell, but this fails to scale to support hand-in for an open femtocell deployment. Pico cells support hand-in, but require detailed cell planning coordination, which inhibits self-deployment scenarios. In a large-scale femtocell deployment, there may be hundreds of femtocells within a macro cell and the neighbor cell list of the macro cell is typically limited to 32 neighbors. Hence, some filtering should occur for intelligently selecting a femtocell for use by an end user.

As a general proposition, femto protocols typically have autonomous rules for configuration in the network. A larger issue addresses how to integrate femtocells into a macro network. In this context, some compromises are reached in effectively coordinating flows between a femtocell and the macro network. One challenge is associated with handing-in or handing-out the user between the networks. A linear solution may involve a direct configuration for an end user, who was only authorized for a certain femtocell. This represents a closed model in which the channel is provided for this particular use case. This can be somewhat straightforward, but it offers little in the way of flexibility for end users.

In contrast to these inferior approaches, example embodiments of the present disclosure provide a technique that supports open femtocell deployment, which supports a hand-in capability. Such a solution allows a full integration of femtocells into the macro network for both hand-in and hand-out scenarios. In such an approach, the system can use dual identities associated with a femtocell. For example, in the context of WCDMA, a primary and a secondary scrambling code can be allocated to the femtocell. One identity is used for idle mode mobility and it includes a selected one out of a pool of limited identities allocated to the femtocells. Procedures are defined in which the macro network broadcasts the pool of neighbor cell information to idle mode mobile nodes, which allows for measuring (by mobile node 34) local femtocell signal strength and performing idle mode cell selection.

In certain example implementations, the system includes location derivation for the femtocell. For example, the femtocell may include a geolocation functionality and report this information to the network (e.g., during provisioning). As used herein in this Specification, the term 'geolocation' is meant to encompass various technologies that help to identify the location of a mobile node, end user, etc. This may include global positioning system (GPS) protocols, triangulation of radio waves approaches, or protocols that can track an Internet Protocol (IP) address, a MAC address, various RFID elements, hardware embedded via an article/production number, embedded software, etc. In other examples, such geolocation information may be associated with Wi-Fi connection locations, GPS coordinates, or self-disclosed information.

Returning to the scenario identified above, the network system can use this geolocation information and, further, register the geolocation of each femtocell automatically. The network system includes the capability to dynamically build a connected mode neighbor cell list for a particular user. The system may include location capability for geolocating a particular user (e.g., by a time of arrival of the end user, via GPS, or through other techniques as outlined above). The network uses this information to determine if the user is in the vicinity of any femtocells. The network also uses this geolocation information to build the per-user neighbor cell list.

The neighbor cell list can correspond to the second identity for the femtocells (e.g., corresponding to the secondary scrambling codes in a WCDMA example). These scrambling codes can be allocated by the network, or provided via some network node designated this responsibility. The codes may be allocated by providing a larger pool of secondary scrambling codes to the femtocell, or by using the geolocation of the femtocell information transmitted to the network to allow the network to dynamically select the optimum secondary scrambling code.

The network may use additional information to determine whether to populate the per-user neighbor cell list. For example, if the network determines the user is moving at high speed, the network may determine that per-user neighbor cell lists should not be allocated. Mobile node 34 is operable to receive its neighbor cell list in a connected mode by receiving transmissions from Node B 44, where mobile node 34 performs measurements according to a given set of rules (e.g., defined in a standard) including reporting such measurements to radio network controller 38. The reported measurements allow the network to determine whether hand-in to the femtocell is appropriate. The association of a unique secondary identifier then allows the network to signal the correct femtocell for the hand-in operation.

Before turning to some of the operations of this architecture, a brief discussion is provided about some of the infrastructure of FIG. 1A. Mobile node 34 can be associated with clients or customers wishing to initiate a communication in communication system 10 via some network. The term 'mobile node' is inclusive of devices used to initiate a communication, such as a computer, a personal digital assistant (PDA), a laptop or electronic notebook, a cellular telephone, an I-phone, an IP phone, or any other device, component, element, or object capable of initiating voice, audio, video, or data exchanges within communication system 10. Mobile node 34 may also be inclusive of a suitable interface to the human user, such as a microphone, a display, a keyboard, or other terminal equipment. Mobile node 34 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, or script data, or any type of source or object code, or any other suitable information in any appropriate format that may be communicated from one point to another.

Femto management system 12 is a network element configured to interface with femtocell 32 and neighbor cell database 18. In one example, as femtocell 32 powers on, it reports its geolocation information and secondary scrambling code allocation information. This information can be reported (in this example) to femto management system 12. In this instance, there are two emissions from the same cell: one for a primary scrambling code and another for a secondary scrambling code. The secondary scrambling code is no longer a range of scrambling codes from which the device may select. Secondary scrambling codes can be unique to the particular femtocell. This assists in the handing-in of the user from the macro network to the femtocell. These hand-in operations are explained in detail below.

Neighbor cell database 18 is a storage element that can be accessed by various elements within the network. In one example, the information being tracked or sent by RNC 38 and/or radio resource management system 22 could be stored in (or retrieved from) neighbor cell database 18. Neighbor cell database 18 may further include any register, control list, or storage structure: all of which can be referenced at any suitable timeframe.

Macro network 30 represents a series of points or nodes of interconnected communication paths for receiving and transmitting packets of information that propagate through communication system 10. Macro network 30 offers a communicative interface between mobile node 34 and selected nodes in the network, and may be any local area network (LAN), wireless local area network (WLAN), metropolitan area network (MAN), wide area network (WAN), virtual private network (VPN), Intranet, extranet, or any other appropriate architecture or system that facilitates communications in a network environment. Macro network 30 may implement a user datagram protocol (UDP)/internet protocol (UDP/IP) connection and use a transmission control protocol (TCP/IP) communication language protocol in particular embodiments of the present disclosure. However, macro network 30 may alternatively implement any other suitable communication protocol for transmitting and receiving data packets within communication system 10.

Macro network 30 includes a given coverage area for servicing multiple end users and for managing their associated connectivity. Macro network 30 represents one or more macro cells, which can provide access to a group of mobile nodes 34. Macro network 30 could have a multitude of femtocells (for example, Node B 44 may provide macro coverage over an area including 1000 femtocells). In this example of FIG. 1A, macro network 30 includes femtocell 32. A single cell could have multiple neighbors such that femtocell 32, for example, could include six neighboring cells. When the neighbor lists are dimensioned, there is a challenge in effectively coordinating hand-in scenarios between the macro network and the femtocell for a particular group of end users. Operations that address this issue are discussed below.

Femtocell 32 is a small cellular base station designed for use in residential or business environments. Femtocell 32 can connect to the service provider's network (e.g., macro network 30) via broadband (such as DSL, cable, etc.) in one example. Femtocell 32 can offer an access point base station, and support multiple active mobile nodes in a given setting (e.g., business, residential, etc.). In one example implementation, femtocell 32 communicates with mobile node 34 over a radio interface using licensed spectrum and, further, connects to the mobile network infrastructure over a fixed broadband connection. The femtocell can allow a service provider to extend service coverage indoors, especially where access would otherwise be limited or unavailable. The femtocell can incorporate the functionality of a typical base station, but extends it to allow a simpler, self-contained deployment. An example implementation of femtocell 32 is a Universal Mobile Telecommunications System (UMTS) femtocell containing a Node B, RNC, and a GPRS support node (SGSN) with Ethernet for backhaul. Although attention is given in this Specification to UMTS flows, the concepts presented herein are applicable to all standards, including GSM, CDMA2000, TD-SCDMA, WiMAX, etc.

RNC 38 can control a number of Node Bs 44. Traditionally, a static access configuration occurs at the RNC, where emissions occur at a Node B. In using the architecture illustrated by FIG. 1A, this configuration may be dynamically updated based on a particular active mobile node's geolocation information. This ability is afforded through capabilities provided by RNC 38 and through radio resource management system 22. In more specific embodiments, these activities are coordinated through neighbor list modules 40 and 42, which can provide these lists, as detailed below. RNC 38 generally operates as a management component for a radio interface. This management may be done through remote commands to a corresponding Node B within a mobile network. Some of the responsibilities of radio network controllers may include management of radio channels, providing measurement report commands and assisting in handoff/handover scenarios. RNC 38 can alternatively provide for outer loop power control, load control, admission control, packet scheduling, security functions, etc.

Node B 44 is a communications interface between mobile node 34 and RNC 38. Node B 44 could include a base transceiver station and a base station controller in one embodiment. The communications interface provided by the radio access network of Node B 44 may allow data to be exchanged between an end user and any number of selected elements within communication system 10. Node B 44 may facilitate the delivery of a request packet generated by mobile node 34 and the reception of information sought by an end user. Node B 44 is only one example of a communications interface between an end user and Node B 44. Other suitable types of communications interfaces may be used for any appropriate network design and, further, be based on specific communications architectures in accordance with particular needs. Radio resource management system 22 can optimize network communications, and be configured to interface with Node B 44 and with neighbor cell database 18. Node B 44 is a communicative interface, which may comprise radio transmission/reception devices, components, or objects, and antennas. Node B 44 may be coupled to radio network controllers (via one or more intermediate elements) that use a landline (such as a T1/E1 line, for example) interface. Node B 44 may operate as a series of complex radio modems where appropriate. Node B 44 may also perform transcoding and rate adaptation functions in accordance with particular needs.

In one example implementation, radio resource management system 22 and RNC 38 are network elements that facilitate or otherwise help coordinate flows between mobile nodes and a given femtocell (e.g., for networks such as those illustrated in FIG. 1A). As used herein in this Specification, the term 'network element' is meant to encompass network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, radio resource management system 22 and/or RNC 38 include software (e.g., as part of neighbor list modules 40 and 42) to achieve the integration and/or network access operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 1B:
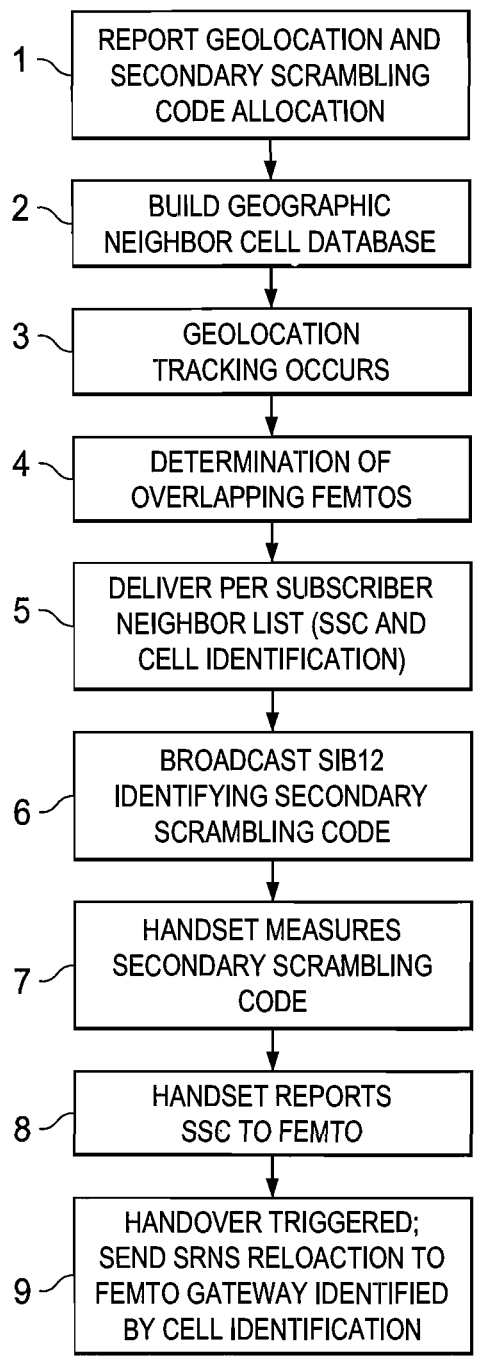
FIG. 1B is a simplified flow diagram illustrating a series of example steps associated with the communication system of FIG. 1A.

FIG. 1B is a simplified flowchart illustrating an example flow for handing-in a particular end user from a macro cell to the femtocell. This FIGURE is discussed in conjunction with FIG. 1A, which includes the arrows that identify the proceeding steps. At an initial step (not depicted), as the femtocell powers on, it activates its geolocation circuitry and contacts femto management system 12, where it receives scrambling code information. At step 1, it reports geolocation information and secondary scrambling code allocation information. This information can be reported to femto management system 12. In this instance, there are two emissions from the same cell: one for the primary scrambling code and another for a secondary scrambling code. The secondary scrambling code is no longer a range of scrambling codes from which the device may select. The secondary scrambling code can be unique to the particular femtocell. This assists in the handing-in of the user from the macro network to the femtocell.

Consider a case where there are 500 femtocells within a given coverage of a particular Node B within a macro network. Clearly, it would not be feasible to advertise 500 different scrambling codes because there is insufficient room in a broadcast message. The challenge lies in intelligently formulating the neighbor list for a particular mobile device. At step 2, a geographic neighbor cell database is constructed. The reported geolocation information of the femtocell is used with the reported secondary scrambling codes to build a database to indicate where the femtocells are located. These femtocells can be viewed as open in that they were not previously configured for a particular end user.

The architecture supports location-based services and this could involve a triangulation of radio waves, GPS activities, or various other operations that help to identify a general location for an end user. Some type of radio access network element can evaluate the location of a particular end user. In one example implementation, Node B 44 is relegated this task. This information can be provided to any suitable node in the network. For example, this location determination may be sent to radio resource management system 22. At this point, a simple lookup may be used to determine which femtocells are within the vicinity of the user. These activities are generally depicted at step 3.

In one example implementation, radio resource management system 22 can determine overlapping femtocells at step 4. Radio resource management system 22 can be responsible for a given coverage area in which femtocells overlap each other. In this example, the determination for any potential overlap is the responsibility of radio resource management system 22. Note that neighbor cell database 18 could be part of radio resource management system 22 such that some of the described messaging can be reduced to simple internal communications. In other instances, a copy of this information (or portions thereof) may be kept (and/or updated at given intervals) at radio resource management system 22 and/or RNC 38.

Returning to the flow above, at this junction, it is acknowledged that this particular user is in a particular location, and at that particular location there are five active femtocells. At step 5, the unique secondary scrambling code is delivered, along with the cell ID, to RNC 38 in this example. Thus, the per-subscriber neighbor list is delivered in this communication, and it identifies a particular femtocell amongst a choice of potential femtocells in this end user's particular region. This addresses the potential ambiguity that exists when there are numerous active femtocells within a given region of the end user.

At step 6, and in a different message in this example, SIB 12 is broadcast and this identifies the secondary scrambling code for active users. Note that SIB 11 is generally used to indicate idle users in this example. These two codes do not have to be the same and in this particular instance, they are not. In essence, SIB 11 was indicating a range of primary scrambling codes allocated to femtocells, whereas SIB 12 is indicating the specific secondary scrambling codes of the femtocells in a particular end user's vicinity.

General radio resource management occurs in the subsequent steps. At step 7, mobile node 34 measures secondary scrambling codes. At step 8, mobile node 34 reports secondary scrambling codes of femtocell 32 to macro network 30. Macro network 30 can trigger the handover and send, for example, a serving network radio subsystem relocation message to a femto gateway identified by the cell ID. This is depicted by step 9. (Recall that the cell ID was delivered at step 5 such that it can be used in the activities of step 9.)

Note that such operations offer scalability by using a unique secondary scrambling code, in comparison to shared scrambling codes, which previously would offer limited flexibility to corresponding end users. As outlined, the system can use shared codes for idle mode (accounting for the limited space in broadcast messages), but this alone fails to account for hand-in scenarios for active users. For example, for an active user, there could be 100 femtocells within the macro network and the question becomes which neighbor cells should that particular end user measure. The concept discussed here, in example embodiments, resolves this issue by dynamically building a neighbor cell list using geolocation information. Because of the inherent nature of idle users, it is difficult to qualify femtocells in the immediate vicinity. In essence, there is no geolocation information, as the end user could be anywhere in the macro network. Thus, shared identities are broadcast in the system through a primary scrambling code. Shared identities do not allow for handing-in of an end user. For active users, there needs to be a qualification of which neighbor femtocells can be provided to a particular end user. One key piece of the proposed solution is the ability to broadcast a primary scrambling code and a secondary scrambling code, where the primary code is used for idle users and the secondary code is used for active users.

FIG. 2 is a simplified block diagram illustrating a femtocell deployment for communication system 10 in one example implementation. FIG. 2 includes a femto system 50, which further includes a number of macro network cells 52, 54, 56, 58, 60, and 62. The broadcast protocol in this case is relaying the SIB ID, which offers a bit representation for identifying a particular femtocell. In this example, each femtocell within the macro network includes a primary scrambling code (PSC) and, for purposes of illustration and teaching, the scrambling codes are provided as 1-6. Also provided for each femtocell is a neighbor primary scrambling code, which again has been arbitrarily chosen to illustrate the activities associated with the architecture. These scrambling codes can be used to differentiate emissions from different cells and, further, spread or scramble the actual communications between cells.

A typical femto deployment could include scrambling codes being configured for a femtocell. As part of its power up procedure, the femtocell can tune its receiver and then monitor the power associated with each scrambling code. In one configuration, the femtocell can elect one of the scrambling codes having the lowest power measurement in order to preserve interference characteristics. In this example, SIB 11 needs to broadcast neighbor identifiers for idle users and SIB 12 needs to broadcast neighbor identifiers for active users.

Figure 3:
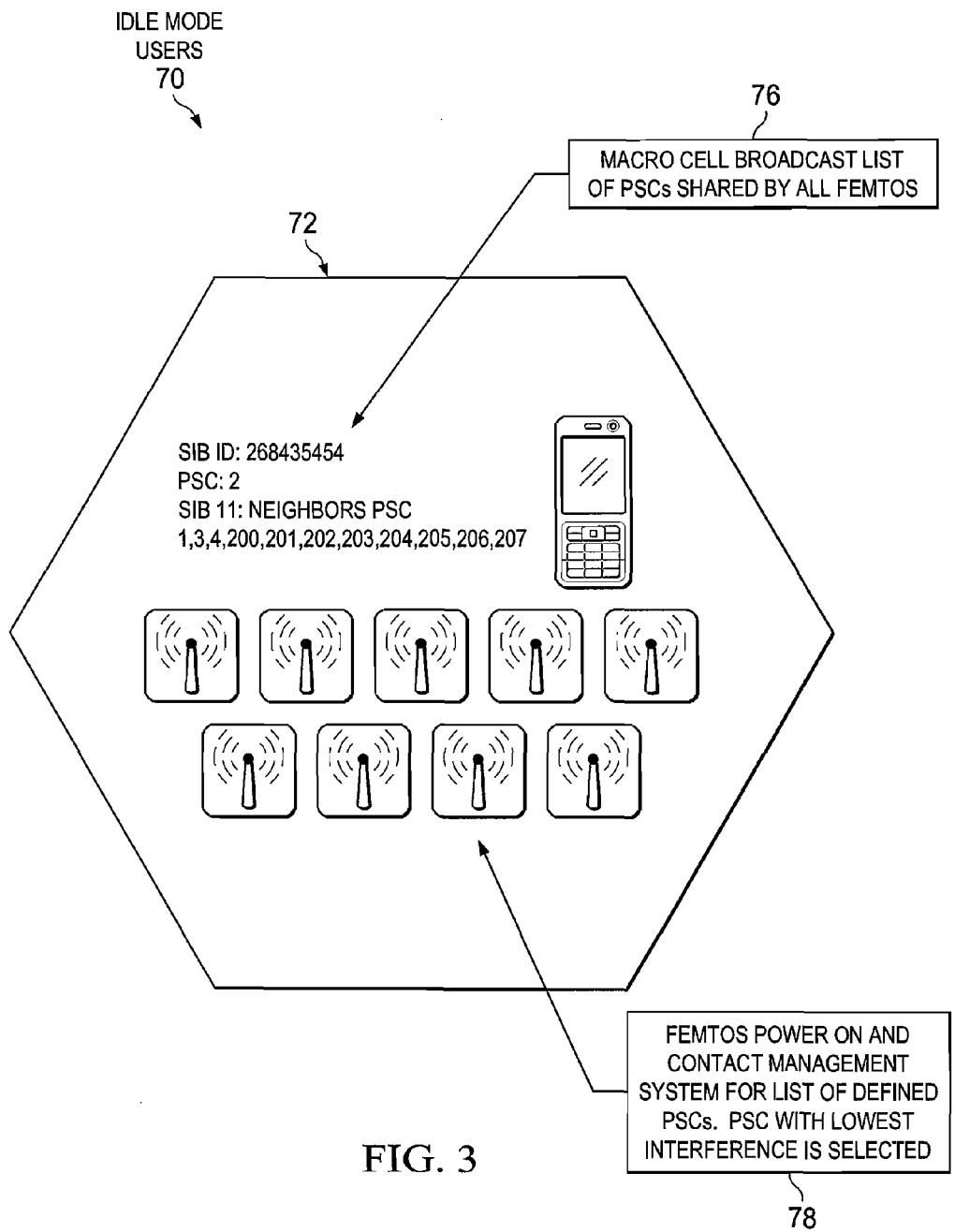
FIG. 3 is a simplified flow diagram of a femtocell system for providing access in a network environment in accordance with another embodiment of the present disclosure.

FIG. 3 illustrates a simplified block diagram depicting another example of a femto system 70 involving idle mode users. This particular configuration includes a macro network cell 72, which includes a number of femtocells that can interface with multiple end users. A given mobile node is illustrated in this particular example for which the channel is sought. In this particular example, a macro cell is advertising 1, 3, 4, and 200-207 for neighbor primary scrambling codes. Thus, macro network cell 72 is broadcasting a list of PSCs shared by all femtocells, as shown by element 76. The femtocells can ultimately configure themselves using any one of these primary scrambling codes.

In operation, femtocells can power on and contact a management system for a list of defined PSCs. The PSC with the lowest interference characteristics could be selected, as shown by element 78. In regards to the mobile node, the mobile node can decode SIB type 11 from the macro cell and, further, measure the PSC. The mobile device can then reselect the femtocell in idle mode. In regards to the internal structure associated with communication system 10, each of RNC 38 and radio resource management system 22 can include memory elements for storing information to be used in achieving the femtocell selection and/or coordination operations, as outlined herein. Additionally, each of these devices may include a processor that can execute software or an algorithm to perform the femtocell selection and/or coordination activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' The information being tracked or sent by RNC 38 and radio resource management system 22 could be provided in any database (e.g., neighbor cell database 18), register, control list, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment. In one example, neighbor list modules 40 and 42 each include their own processor and memory element (as described herein) for achieving the femtocell selection and transmission/reception activities outlined herein.

Note that in certain example implementations, the femtocell selection network access, integration, and/or coordinating functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIG. 1A] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIG. 1A] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and further can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in FIG. 1B illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and broadcast protocols, communication system 10 may be applicable to other exchanges, routing protocols, or routed protocols in which packets (not necessarily the routing protocol/packets described) are exchanged in order to provide scrambling code information, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

In a separate endeavor, communication system 10 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 10. In other examples, FIG. 1A could readily include a serving general packet radio service (GPRS) support node (SGSN), a gateway GPRS support node (GGSN), any type of network access server (NAS), etc. and all of these elements could interface with an authentication, authorization, and accounting (AAA) server. Moreover, the present disclosure is equally applicable to other cellular and/or wireless technology including CDMA, Wi-Fi, WiMax, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   evaluating geolocation information associated with a mobile node;
   using the geolocation information to identify a femtocell capable of providing network access to the mobile node, wherein a primary scrambling code is provided to the mobile node for operation in an idle mode;
   using the geolocation information to dynamically select an optimum secondary scrambling code; and
   communicating the secondary scrambling code to initiate access to the femtocell by the mobile node when operating in an active mode, wherein the primary scrambling code is a shared code and the secondary scrambling code is unique to the femtocell;
   wherein additional network information is used to determine whether a neighbor cell database should be accessed in identifying the femtocell to provide access to the mobile node;
   wherein the secondary scrambling code is included in a broadcast message that includes a femtocell identifier associated with the femtocell; and
   wherein the secondary scrambling code is used to hand-in the mobile node from a macro network to the femtocell.

2. The method of claim 1, wherein the femtocell is identified from a plurality of femtocells based on geolocation information associated with the femtocell.

3. The method of claim 1, wherein the primary scrambling code is part of a range of primary scrambling codes allocated to a plurality of femtocells within a macro network coverage area.

4. The method of claim 1, wherein the secondary scrambling code is used to hand-in the mobile node from a macro network to the femtocell.

5. The method of claim 1, wherein the primary scrambling code and the secondary scrambling code are different and the codes are included in two different messages communicated in a network, each of the messages including a system information block (SIB) element.

6. Logic encoded in one or more non-transitory tangible media that includes code for execution and when executed by a processor operable to perform operations comprising:
    evaluating geolocation information associated with a mobile node;
    using the geolocation information to identify a femtocell capable of providing network access to the mobile node, wherein a primary scrambling code is provided to the mobile node for operation in an idle mode; using the geolocation information to dynamically select an optimum secondary scrambling code; and
    communicating the secondary scrambling code to initiate access to the femtocell by the mobile node when operating in an active mode, wherein the primary scrambling code is a shared code and the secondary scrambling code is unique to the femtocell;
    wherein additional network information is used to determine whether a neighbor cell database should be accessed in identifying the femtocell to provide access to the mobile node;
    wherein the secondary scrambling code is included in a broadcast message that includes a femtocell identifier associated with the femtocell; and
    wherein the secondary scrambling code is used to hand-in the mobile node from a macro network to the femtocell.

7. The logic of claim 6, wherein the femtocell is identified from a plurality of femtocells based on geolocation information associated with the femtocell.

8. The logic of claim 6, wherein the primary scrambling code is part of a range of primary scrambling codes allocated to a plurality of femtocells within a macro network coverage area.

9. The logic of claim 6, wherein the secondary scrambling code is used to hand-in the mobile node from a macro network to the femtocell, and wherein the primary scrambling code and the secondary scrambling code are different and the codes are included in two different messages communicated in a network, each of the messages including a system information block (SIB) element.

10. An apparatus, comprising:
    a memory element configured to store data,
    a processor operable to execute instructions associated with the data, and
    a neighbor list module configured to interface with the processor in order to:
        evaluate geolocation information associated with a mobile node;
        use the geolocation information to identify a femtocell capable of providing network access to the mobile node, wherein a primary scrambling code is provided to the mobile node for operation in an idle mode; using the geolocation information to dynamically select an optimum secondary scrambling code; and
        communicate the secondary scrambling code to initiate access to the femtocell by the mobile node when operating in an active mode, wherein the primary scrambling code is a shared code and the secondary scrambling code is unique to the femtocell;
    wherein additional network information is used to determine whether a neighbor cell database should be accessed in identifying the femtocell to provide access to the mobile node;
    wherein the secondary scrambling code is included in a broadcast message that includes a femtocell identifier associated with the femtocell; and
    wherein the secondary scrambling code is used to hand-in the mobile node from a macro network to the femtocell.

11. The apparatus of claim 10, wherein the femtocell is identified from a plurality of femtocells based on geolocation information associated with the femtocell.

12. The apparatus of claim 10, wherein the primary scrambling code is part of a range of primary scrambling codes allocated to a plurality of femtocells within a macro network coverage area.

13. The apparatus of claim 10, wherein the secondary scrambling code is used to hand-in the mobile node from a macro network to the femtocell.

14. The apparatus of claim 10, wherein the primary scrambling code and the secondary scrambling code are different and the codes are included in two different messages communicated in a network, each of the messages including a system information block (SIB) element.

* * * * *